(12) United States Patent
Sikavi

(10) Patent No.: US 12,162,588 B2
(45) Date of Patent: Dec. 10, 2024

(54) HIGH PERFORMANCE WINGLET

(71) Applicant: Aviation Partners, Inc., Seattle, WA (US)

(72) Inventor: Danny A. Sikavi, Seattle, WA (US)

(73) Assignee: Aviation Partners, Inc., Seattle, WA (US)

( * ) Notice: Subject to any disclaimer, the term of this patent is extended or adjusted under 35 U.S.C. 154(b) by 242 days.

(21) Appl. No.: 17/420,970

(22) PCT Filed: Jan. 7, 2020

(86) PCT No.: PCT/US2020/012597
§ 371 (c)(1),
(2) Date: Jul. 6, 2021

(87) PCT Pub. No.: WO2020/146399
PCT Pub. Date: Jul. 16, 2020

(65) Prior Publication Data
US 2022/0097830 A1 Mar. 31, 2022

Related U.S. Application Data

(60) Provisional application No. 62/789,293, filed on Jan. 7, 2019.

(51) Int. Cl.
*B64C 23/06* (2006.01)
(52) U.S. Cl.
CPC .................... *B64C 23/069* (2017.05)
(58) Field of Classification Search
CPC  B64C 23/069; B64C 3/16; B64C 3/14; B64C 3/10
See application file for complete search history.

(56) References Cited

U.S. PATENT DOCUMENTS 7,644,892 B1 *  1/2010  Alford, Jr. ............ B64C 23/065
                                                  244/35 R
7,971,832 B2   7/2011  Hackett et al.
(Continued)

FOREIGN PATENT DOCUMENTS

GB         2587429 A  *  3/2021  ............ B64C 23/065

OTHER PUBLICATIONS

PCT/US2020/12597 filed Jan. 7, 2020 Interational Search Report and Written Opinion filed Mar. 14, 2020.

*Primary Examiner* — Rodney A Bonnette
(74) *Attorney, Agent, or Firm* — Rutan & Tucker LLP

(57) ABSTRACT

High-performance winglets are provided for attachment to an airplane wing. A split blended winglet includes a blended or upper winglet smoothly extending from the wing tip above a chord plane of the wing and a lower winglet including a ventral fin projecting below the chord plane from a lower surface of the upper winglet. The upper winglet includes a blade section that projects vertically along a reverse curve before transitioning to a linear upper blade portion. Upper and lower surfaces of the upper winglet are bound by leading and trailing edges that are swept toward an airstream direction, parallel with the chord plane, and curve toward the airstream direction before terminating at a point distal of the wing tip. Upper and lower surfaces of the lower winglet are bound by leading and trailing edges that curve toward the airstream direction and terminate at a point distal of the wing tip.

23 Claims, 10 Drawing Sheets

(56) References Cited

U.S. PATENT DOCUMENTS

| | | |
|---|---|---|
| 8,366,056 B2 | 2/2013 | Garang |
| 8,944,386 B2 | 2/2015 | Gratzer |
| 9,038,963 B2 | 5/2015 | Gratzer |
| 9,193,445 B2 | 11/2015 | Wright et al. |
| 9,302,766 B2 | 4/2016 | Gratzer |
| 9,434,470 B2 | 9/2016 | Gratzer |
| 9,580,170 B2 | 2/2017 | Gratzer |
| 9,988,142 B2 | 6/2018 | Heller |
| 10,106,247 B2 | 10/2018 | Gratzer |
| 2009/0084901 A1 | 4/2009 | Lam et al. |
| 2011/0024573 A1 | 2/2011 | Kirk et al. |
| 2017/0073062 A1* | 3/2017 | Firth .................... B64C 23/069 |
| 2020/0094947 A1* | 3/2020 | Commis ............... B64C 23/069 |

* cited by examiner

HIGH PERFORMANCE WINGLET

PRIORITY

This application is a U.S. national stage of International Application No. PCT/US2020/012597, which claims the benefit of priority to U.S. Provisional Patent Application No. 62/789,293, filed Jan. 7, 2019, each of which is incorporated by reference in its entirety into this application.

BACKGROUND

All aircraft wings experience drag as they move through the air. The experienced drag may be separated into three components: induced drag, parasitic drag, and compressibility drag. Induced drag depends on the lift force carried by the lifting surfaces. Parasitic drag arises from contact between a moving surface and the fluid and includes such factors as the object form, skin friction, and interference factors. Compressibility drag is the drag associated with higher Mach numbers, which may include viscous and vortex drag, shock-wave drag, and any drag due to shock-induced separations, all of which may vary with Mach number. Of these, the induced drag has traditionally shown the greatest proportion for improvement by use of winglets or other wing tip devices.

Generally, an aircraft's wing may be swept to reduce compressibility drag effects on high-speed airplanes. A swept wing is generally designed so the angle between the aircraft's body and the wing is oblique, and specifically is swept toward the aft of the aircraft. The sweep angles of the wing's leading edge and trailing edge does not necessarily have to be the same. A wing tip device may also be added to further reduce the induced drag on the wing. One alternative is to provide a raked wing tip. A raked wing tip conventionally has a higher degree of sweep than the rest of the wing. Winglets are also an alternative solution, generally used to increase the effective aspect ratio of a wing, with less structural impact than adding wingspan. Winglets are generally near vertical extensions of the wing tip. Wing tip devices may increase the outboard lift generated at the wing tip, and reduce the induced drag caused by wingtip vortices, improving the lift-to-drag ratio.

Although winglets reduce drag generated by wingtip vortices, winglets re-distributes the lift that increases the bending moment on the wing. A split winglet is designed to reduce drag with a lower bending moment penalty than existing winglets. The split winglet generally includes an upward sloping element similar to an existing winglet and a downward canted element known as a ventral fin. The ventral fin counters vortices generated by interactions between the wingtip and the lower wing surface.

Split winglet designs are set forth, for example, in U.S. Pat. Nos. 8,944,386; 9,038,963; 9,302,766; 9,434,470; and 9,580,170, each of which is incorporated in its entirety into this application. The split winglet design is known to reduce drag by up to 9.5% over an unmodified wing, and improve cruise performance by more than 30% over existing blended-winglet configurations. As such, there is a continuing need for split winglets that are capable of further improving fuel burn, as well as reducing drag and decreasing the bending moment of an airplane wing.

Embodiments of high-performance winglets described herein include blended and split blended winglets. Such winglets are adaptable to various wings and wing tip designs and attach as a single assembly to a wing tip.

SUMMARY

Disclosed herein is a split blended winglet designed for an airplane wing. The split blended winglet includes, in some embodiments, an upper winglet section and a lower winglet section. The upper winglet section includes a base section, a blade section, and a radius section. The base section is configured for attachment to a tip of the airplane wing. The blade section projects in a vertical direction above the base section. The blade section comprises a reverse curve. The radius section interconnects the base section and the blade section. The lower winglet section includes a ventral fin projecting in the vertical direction below the base section.

In some embodiments, the upper winglet section includes a leading edge and a trailing edge respectively comprising an extension of a leading edge and a trailing edge of the airplane wing. The leading and trailing edges of the upper winglet section extend along the base section, the radius section, and upwards along the blade section.

In some embodiments, the leading and trailing edges of the upper winglet section curve toward an airstream direction and terminate at a winglet tip atop the blade section.

In some embodiments, the blade section projects vertically along the reverse curve before transitioning to a linear upper blade portion that terminates at the winglet tip atop the blade section.

In some embodiments, the reverse curve is configured such that an upper surface of the blade section includes a downward-facing portion adjacent to the upper blade portion.

In some embodiments, the downward-facing portion is configured to contribute to a reduction in the bending moment exerted on the airplane wing.

In some embodiments, the leading and trailing edges of the upper winglet section comprise a compound curve beginning with the radius section and extending along the blade section including the reverse curve.

In some embodiments, the lower winglet section includes a chord length that is equal to or less than a chord length of the upper winglet section at an attachment location about the radius section where the lower winglet section is joined with upper winglet section.

In some embodiments, the lower winglet section includes a leading edge comprising a curved portion configured to reduce the discontinuity between the upper winglet section and the lower winglet section.

In some embodiments, the curved portion extends from a bottom surface of the radius section.

In some embodiments, the leading edge of the lower winglet section extends linearly from the curved portion before transitioning along an airstream-directed continuous curve toward a tip of the ventral fin.

In some embodiments, the lower winglet section includes a trailing edge that linearly extends from a point along the radius section and then curves toward the tip of the ventral fin.

In some embodiments, the radius section is positioned outboard of a radius section of a standard split blended winglet.

In some embodiments, the reverse curve positions a winglet tip atop the blade section in a vertical position similar to a vertical position of a winglet tip of a standard split blended winglet.

In some embodiments, the split blended winglet is configured to provide relatively more effective wingspan than the standard split blended winglet without undesirably positioning the winglet tip atop the blade section farther outboard.

In some embodiments, the split blended winglet exhibits a reduction in drag ranging between about 1.6% and 2.0% relative to the standard split blended winglet under the same loading.

In some embodiments, the radius section is configured to position the ventral fin farther outboard than a ventral fin of the standard split blended winglet.

In some embodiments, the ventral fin of the split blended winglet is configured to have a relatively greater cant angle than the ventral fin of the standard split blended winglet.

In some embodiments, the greater cant angle reduces a bending load exerted on the airplane wing.

Also disclosed herein is a blended winglet designed for an airplane wing. The blended winglet includes, in some embodiments, a base section, a blade section, and a radius section. The base section is configured for attachment to a tip of the airplane wing. The blade section projects in a vertical direction above the base section. The blade section comprises a reverse curve. The radius section interconnects the base section and the blade section.

In some embodiments, the blended winglet includes a leading edge and a trailing edge respectively comprising an extension of a leading edge and a trailing edge of the airplane wing. The leading and trailing edges of the blended winglet extend along the base section, the radius section, and upwards along the blade section.

In some embodiments, the leading and trailing edges of the blended winglet curve toward an airstream direction and terminate at a winglet tip atop the blade section.

In some embodiments, the blade section projects vertically along the reverse curve before transitioning to a linear upper blade portion that terminates at the winglet tip atop the blade section.

In some embodiments, the reverse curve is configured such that an upper surface of the blade section includes a downward-facing portion adjacent to the upper blade portion.

In some embodiments, the downward-facing portion is configured to contribute to a reduction in the bending moment exerted on the airplane wing.

In some embodiments, the leading and trailing edges of the blended winglet comprise a compound curve beginning with the radius section and extending along the blade section including the reverse curve.

These and other features of the concepts provided herein will become more apparent to those of skill in the art in view of the accompanying drawings and following description, which describe particular embodiments of such concepts in greater detail.

DRAWINGS

DESCRIPTION

Figure 1A:
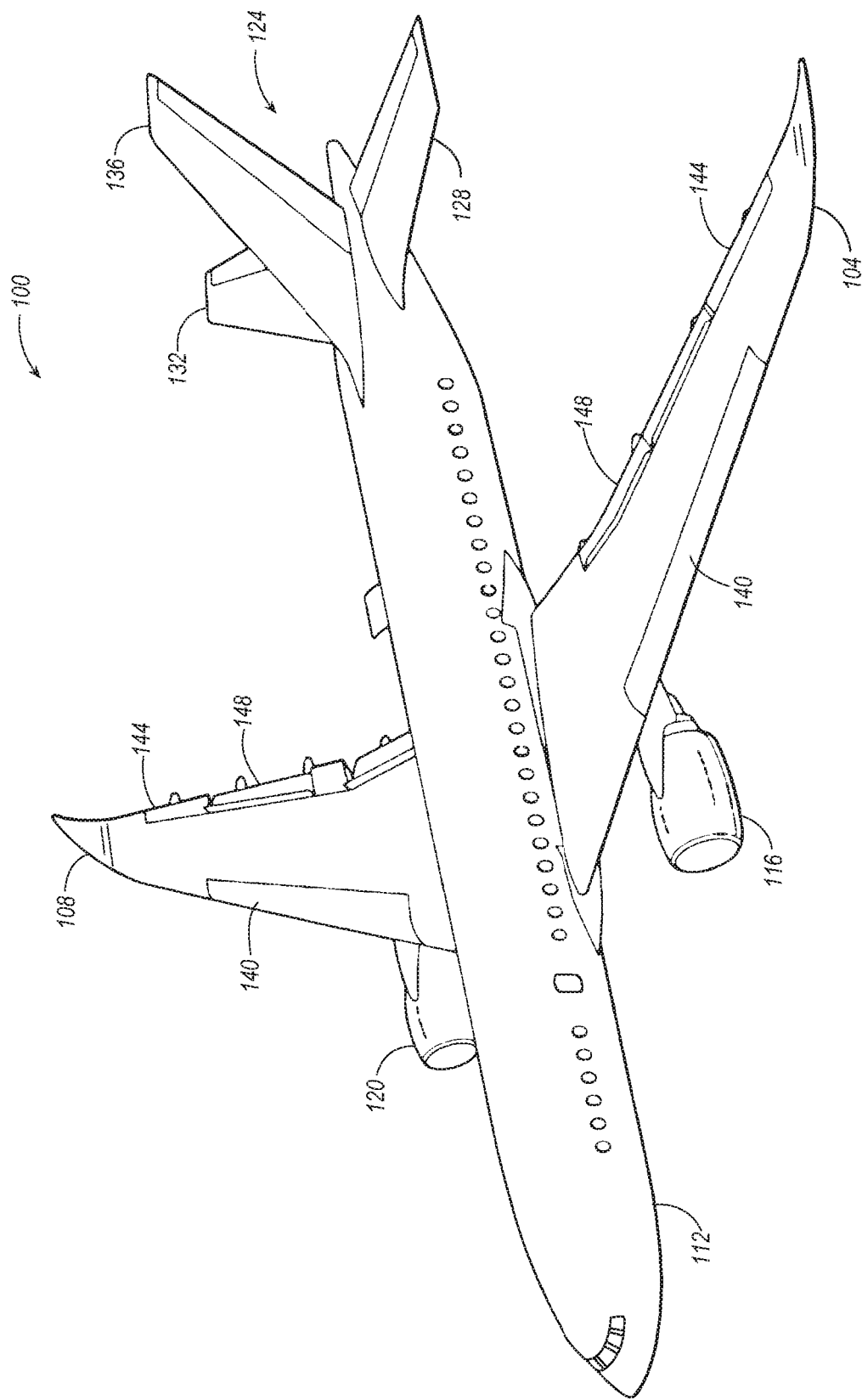
FIG. 1A illustrates a perspective view of an example aircraft suitable for implementation of a blended or split blended winglet in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated therefrom and optionally combined with or substituted for features of any of a number of other embodiments disclosed herein.

Regarding terms used herein, it should also be understood the terms are for the purpose of describing some particular embodiments, and the terms do not limit the scope of the concepts provided herein.

Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps.

Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The term "coupled" is defined as meaning connected either directly to the component or indirectly to the component through another component.

The terms "about," "approximately," or "substantially" for any numerical values or ranges indicate a suitable dimensional tolerance that allows the part or collection of components to function for its intended purpose as described herein.

Unless defined otherwise, all technical and scientific terms used herein have the same meaning as commonly understood by those of ordinary skill in the art.

All aircraft wings experience drag as they move through the air. Induced drag has traditionally shown the greatest potential for improvement through the use of winglets. Although winglets reduce drag generated by wingtip vortices, winglets re-distributes the lift that increases the bending moment on the wing. A split winglet is designed to reduce drag with a lower bending moment penalty than existing winglets. The split winglet generally includes an upward sloping element similar to an existing winglet and a downward canted element known as a ventral fin. The ventral fin counters vortices generated by interactions between the wingtip and the lower wing surface. The split winglet design is known to reduce fuel burn and drag over an unmodified wing and improve cruise performance over existing blended-winglet configurations. As such, there is a continuing need for split winglets that are capable of further improving fuel burn, as well as reducing drag and decreasing the bending moment of an airplane wing. Embodiments of high-performance winglets described herein include blended and split blended winglets. Such winglets are adaptable to various wings and wing tip designs and attach as a single assembly to a wing tip.

FIG. 1A illustrates a perspective view of an example aircraft suitable for implementation of a blended or split blended winglet in accordance with some embodiments. The aircraft 100 comprises a first wing 104 and a second wing 108 attached to a body 112. An engine 116 is coupled with the first wing 104, and an engine 120 is coupled with the second wing 108. The body 112 includes a tail section 124 that includes a first horizontal stabilizer 128, a second horizontal stabilizer 132, and a vertical stabilizer 136. It should be understood that the illustration of the aircraft 100 in FIG. 1A is not meant to imply physical or architectural limitations to the manner in which an illustrative configuration may be implemented. For example, although the aircraft 100 is a commercial aircraft, in other embodiments the aircraft 100 may be a military aircraft, rotorcraft, helicopter, unmanned aerial vehicle, spaceplane, or any other suitable aircraft.

Moreover, although the illustrative examples are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a train, a spacecraft, a submarine, an automobile, a power plant, a windmill, a manufacturing facility, a building, and other suitable platforms configured to interact with exterior fluids such as atmospheric air or water.

As shown in FIG. 1A, slats 140 are disposed along a leading edge of the first and second wings 104, 108. The slats 140 generally enable a pilot to alter the performance characteristics of the aircraft 100 by manipulating the nose camber of the wings 104, 108. In some embodiments, however, leading edge devices other than the slats 140 may be incorporated into the aircraft 100. For example, leading edge devices may include fixed slots, nose flaps, Kruger flaps, cuffs, and other similar devices. In general, the slats 140 extend along the leading edges of the wings 104, 108 forward and downward, thereby keeping air flowing over the wings at slower speeds.

Coupled with a trailing edge of each of the first and second wings 104, 108 are ailerons 144 and trailing edge flaps 148. As will be appreciated, the ailerons 144 enable the pilot to control rolling of the aircraft 100. The trailing edge flaps 148 preferably are of the Fowler variety that enable the pilot to manipulate the performance of the aircraft 100 by altering the camber and cord of the first and second wings 104, 108.

Figure 1B:
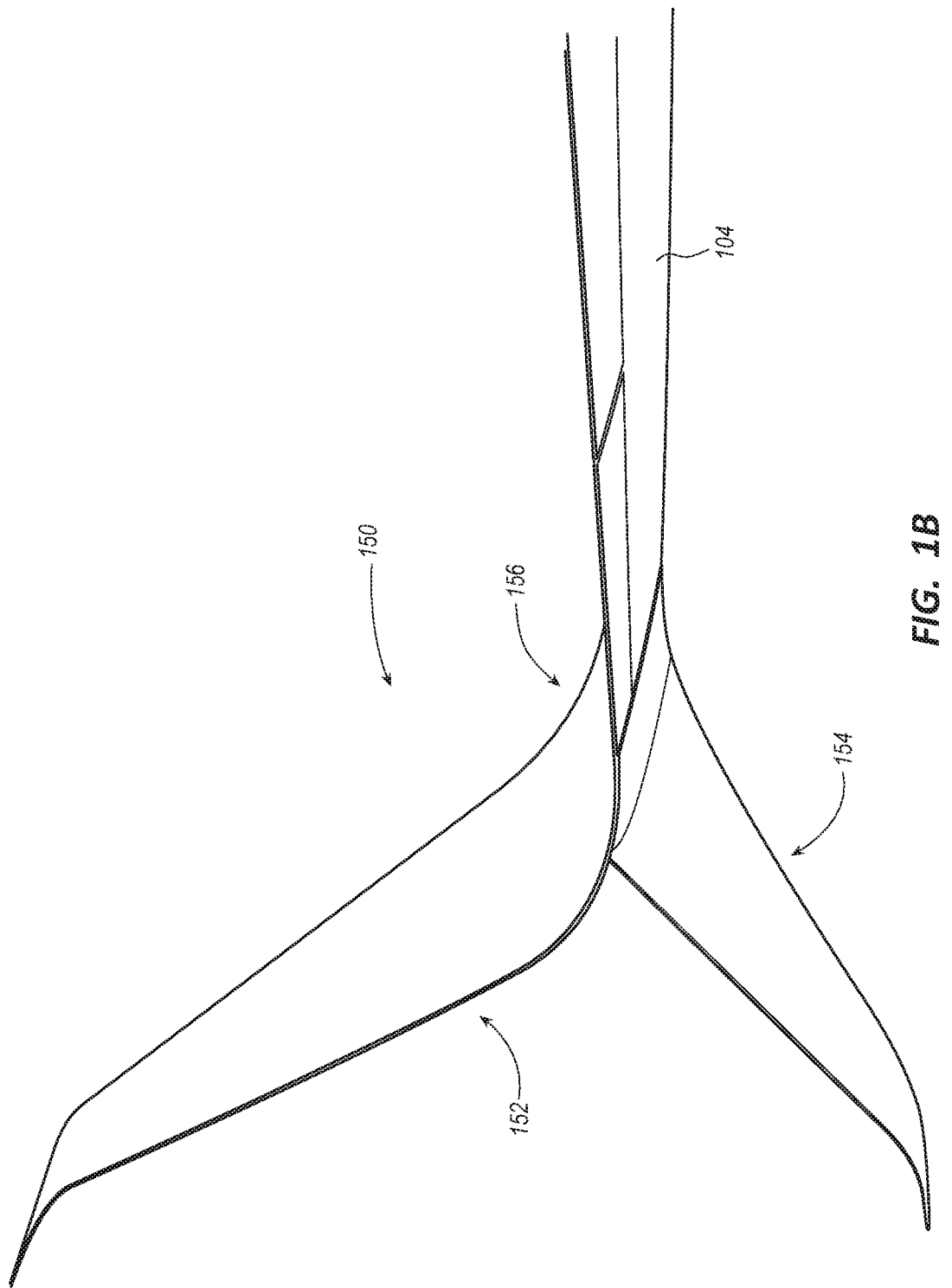
FIG. 1B illustrates a perspective view of a split blended winglet in accordance with some embodiments.

Any of various wing tip devices disclosed herein, such as a blended winglet 151 or a split blended winglet 150, for example as shown in FIG. 1B, may be disposed at the extremal tips of the first and second wings 104, 108.

Figure 2A:
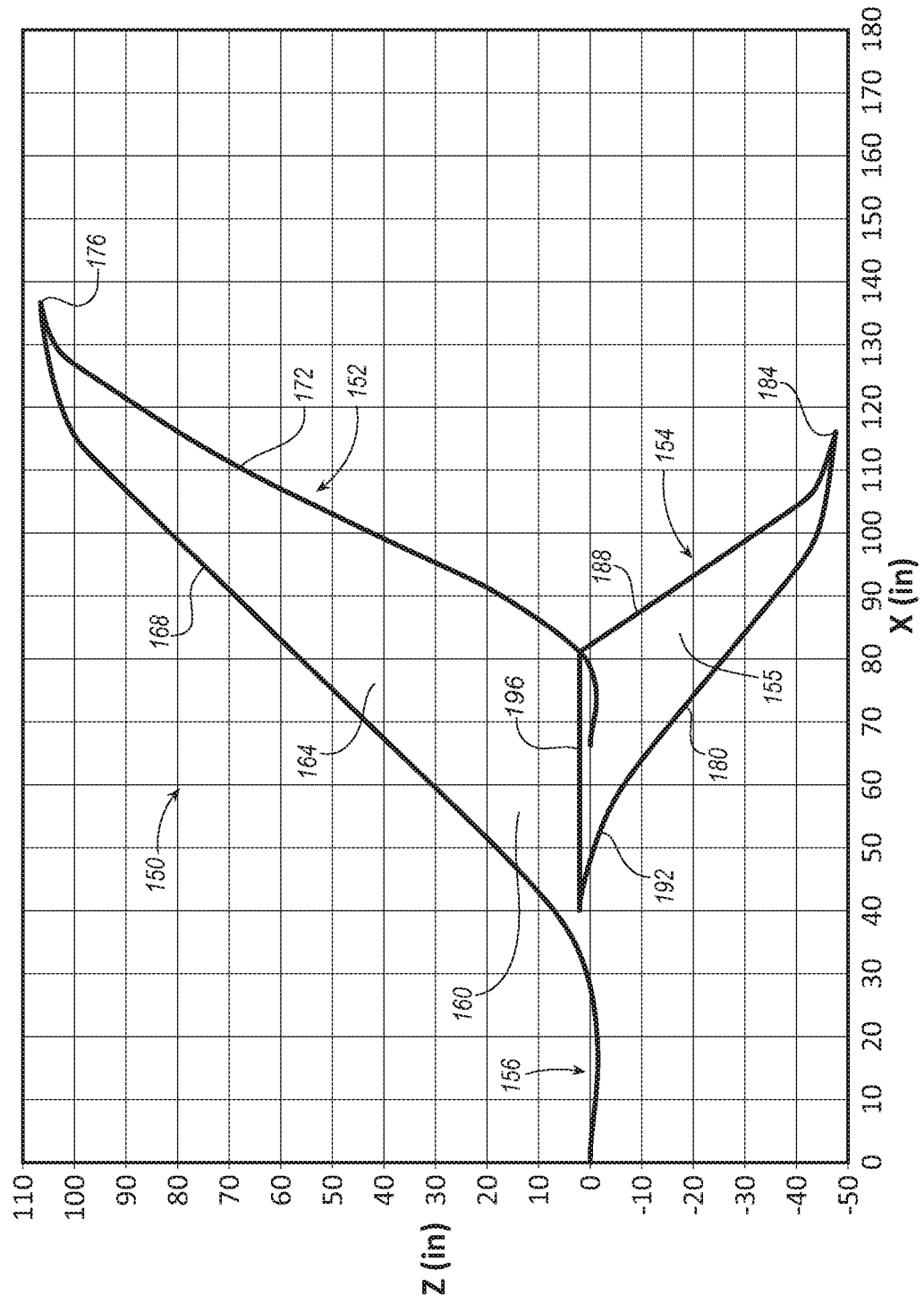
FIG. 2A illustrates a side view of leading and trailing edges of a split blended winglet coupled with an airplane wing in accordance with some embodiments.

As best illustrated in FIG. 2A, the split blended winglet 150, configured to be disposed at the tip of the first wing 104, includes an upper winglet section 152 and a lower winglet section 154. The lower winglet section 154 comprises a ventral fin 155 that is a generally planar projection below the upper winglet section 152 and extends generally below the plane of the wing 104 at an angle with respect to vertical. The upper winglet section 152 includes a base section 156, a radius section 160, and a blade section 164. The base section 156 is configured to attach to a tip of the airplane wing 104, thereby functionally becoming an extension of the wing 104. The blade section 164 projects in a generally vertical direction above the base section 156 of the split blended winglet 150, as discussed in greater detail herein below. The radius section 160 is a generally curved portion that interconnects the base and blade sections 156, 164.

Figure 2B:
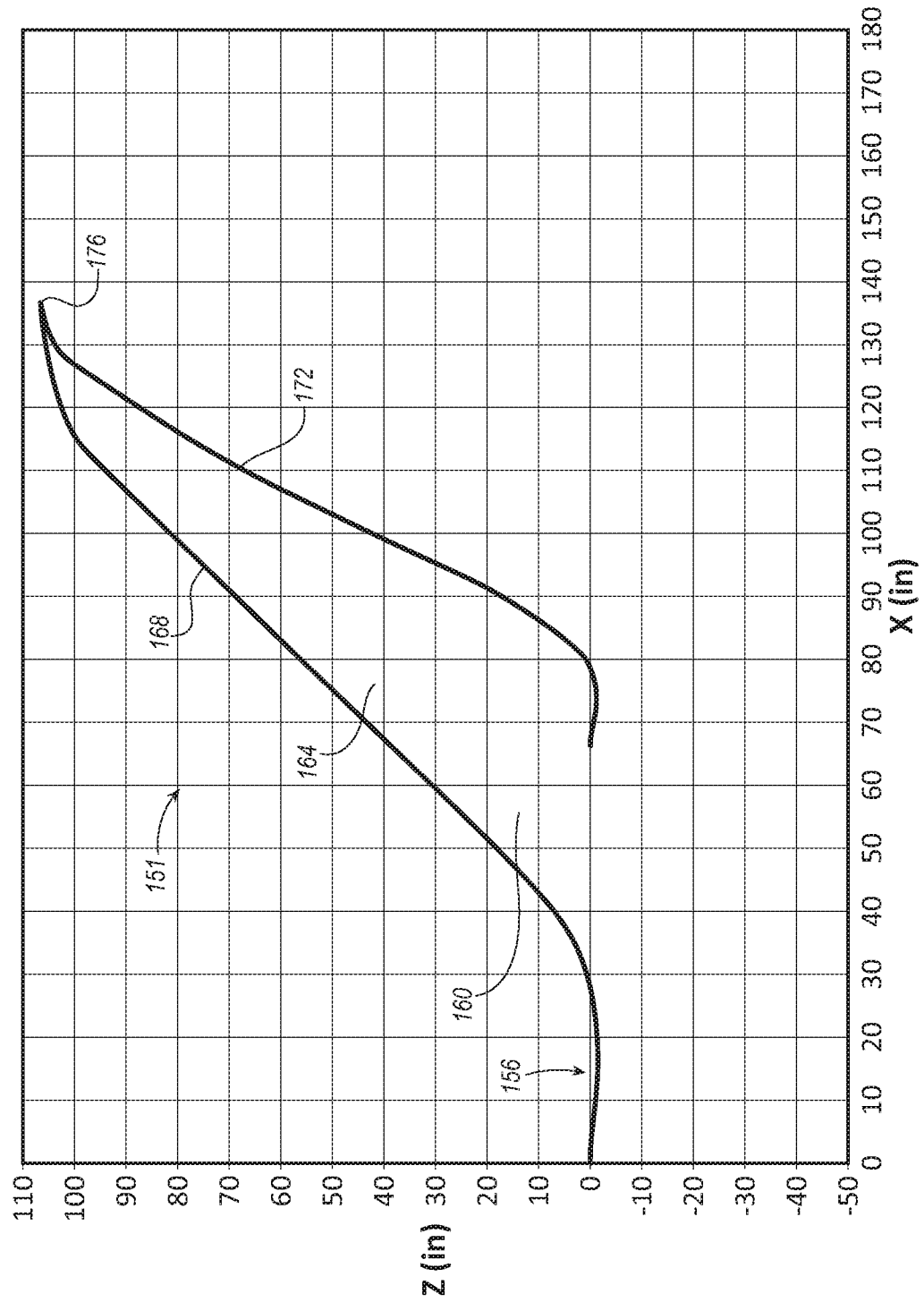
FIG. 2B illustrates a side view of leading and trailing edges of a blended winglet coupled with an airplane wing in accordance with some embodiments.

As best illustrated in FIG. 2B, the blended winglet 151, configured to be disposed at the tip of the first wing 104, includes the base section 156, the radius section 160, and the blade section 164 as described for the upper winglet section 152 of the split blended winglet 150.

Although the blended winglet 151 and the split blended winglet 150 are often specifically discussed herein with respect to the first wing 104, it should be understood that substantially identical structures and mechanisms, or the mirror images thereof, are to be disposed at the tip of the second wing 108, as well. Moreover, it should be understood that each winglet of the blended winglet 151 and the split blended winglet 150 is an example and, thus, any of a wide variety of wing tip devices may be coupled with the first and second wings 104, 108, including, but not necessarily limited to, various blended winglets, standard unblended winglets and wing fences, spiroids, split blended winglets, raked wing tips, and the like.

With continuing reference to FIGS. 2A and 2B, the upper winglet section 152 or the blended winglet 151 includes a leading edge 168 that is a smooth extension of the leading edge of the wing 104. The leading edge 168 extends along the base section 156, the radius section 160, and upwards along the blade section 164. Similarly, a trailing edge 172 is a smooth extension of the trailing edge of the first wing 104 and extends along the base section 156, the radius section 160, and the blade section 164. The leading edge 168 and the trailing edge 172 curve toward an airstream direction (i.e., toward the "aft" of the airplane 100) and terminate at a winglet tip 176 atop the blade section 164.

As mentioned above, the ventral fin 155 of the split blended winglet 150 is a generally planar projection below the upper winglet section 152 and extends generally below the plane of the wing 104 at an angle with respect to vertical. The ventral fin 155 is generally wing shaped, such that it is swept and tapered. The lower winglet section 154 includes a leading edge 180 having a curved portion 192 extending from a bottom surface of the radius section 160 of the upper winglet section 152. The curved portion 192 becomes generally linear along the ventral fin 155 before transitioning along a continuous curve toward the airstream direction at a ventral fin tip 184. A trailing edge 188 of the lower winglet section 154 may be generally linear extending from a point along the trailing edge 172 of the radius section 160 of the upper winglet section 152 and then curved toward the airstream direction (i.e., toward the "aft" of the airplane 100) at the ventral fin tip 184. In the illustrated embodiment of FIG. 2A, the leading edge 180 includes the curved portion 192 configured to reduce the discontinuity between the upper winglet section 152 and the lower winglet section 154.

Moreover, the lower winglet section 154 includes a chord length that may be equal to or less than the chord length of the upper winglet section 152 at an attachment location 196 about the radius section 160 where the lower winglet section 154 is joined with the upper winglet section 152. In the illustrated embodiment of FIG. 2A, for example, the chord length of the lower winglet section 154 is less than the chord length of the upper winglet section 152 at the attachment location 196. As such, the trailing edge 188 of the lower winglet section 154 emanates from a point along the trailing edge 172 of the upper winglet section 152, and the curved portion 192 of the leading edge 180 of the lower winglet section 154 emanates from a bottom surface of the upper winglet section 152.

Figure 3A:
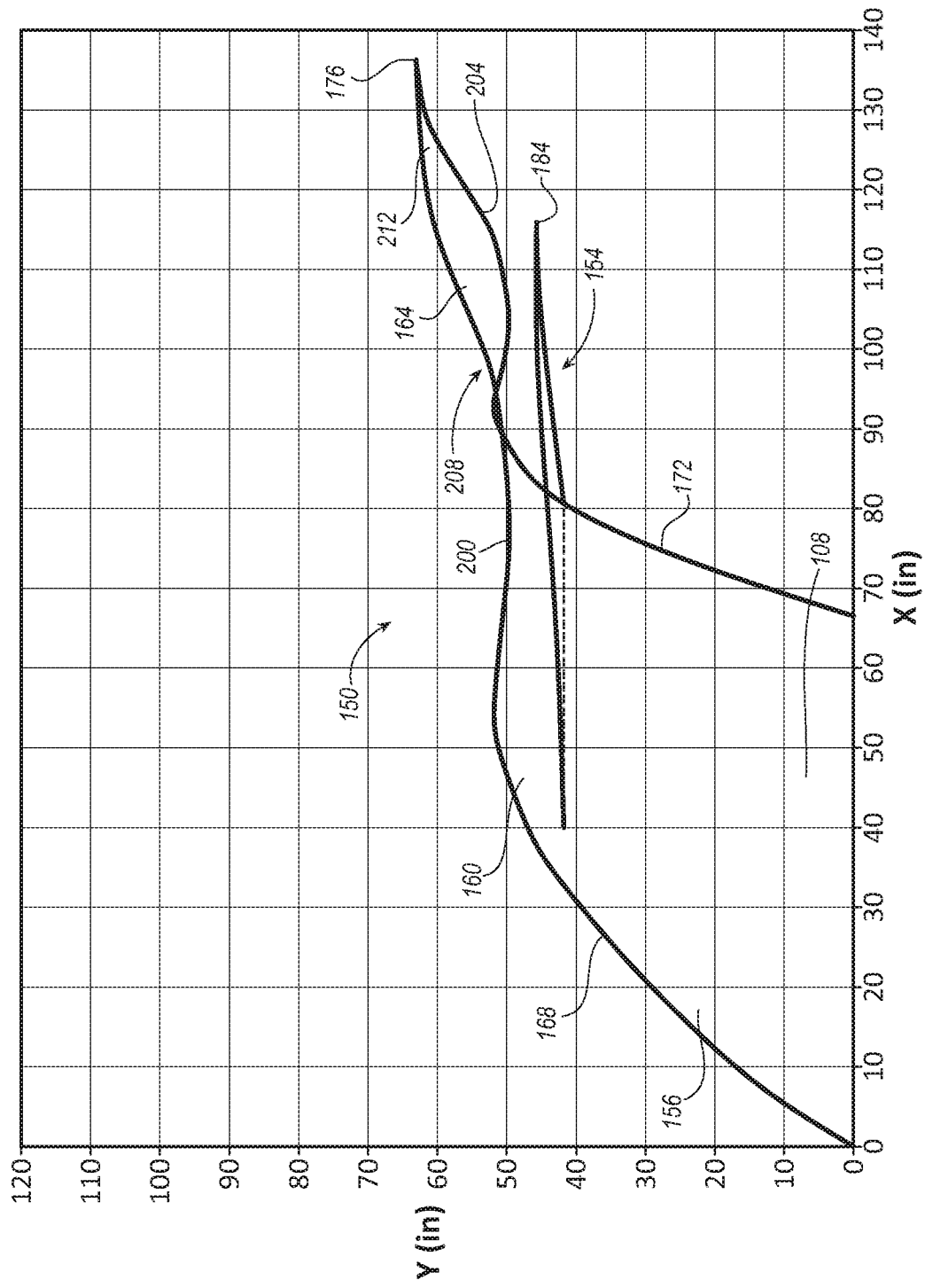
FIG. 3A illustrates a top view of the leading and trailing edges of the split blended winglet coupled with an airplane wing in accordance with some embodiments.
Figure 3B:
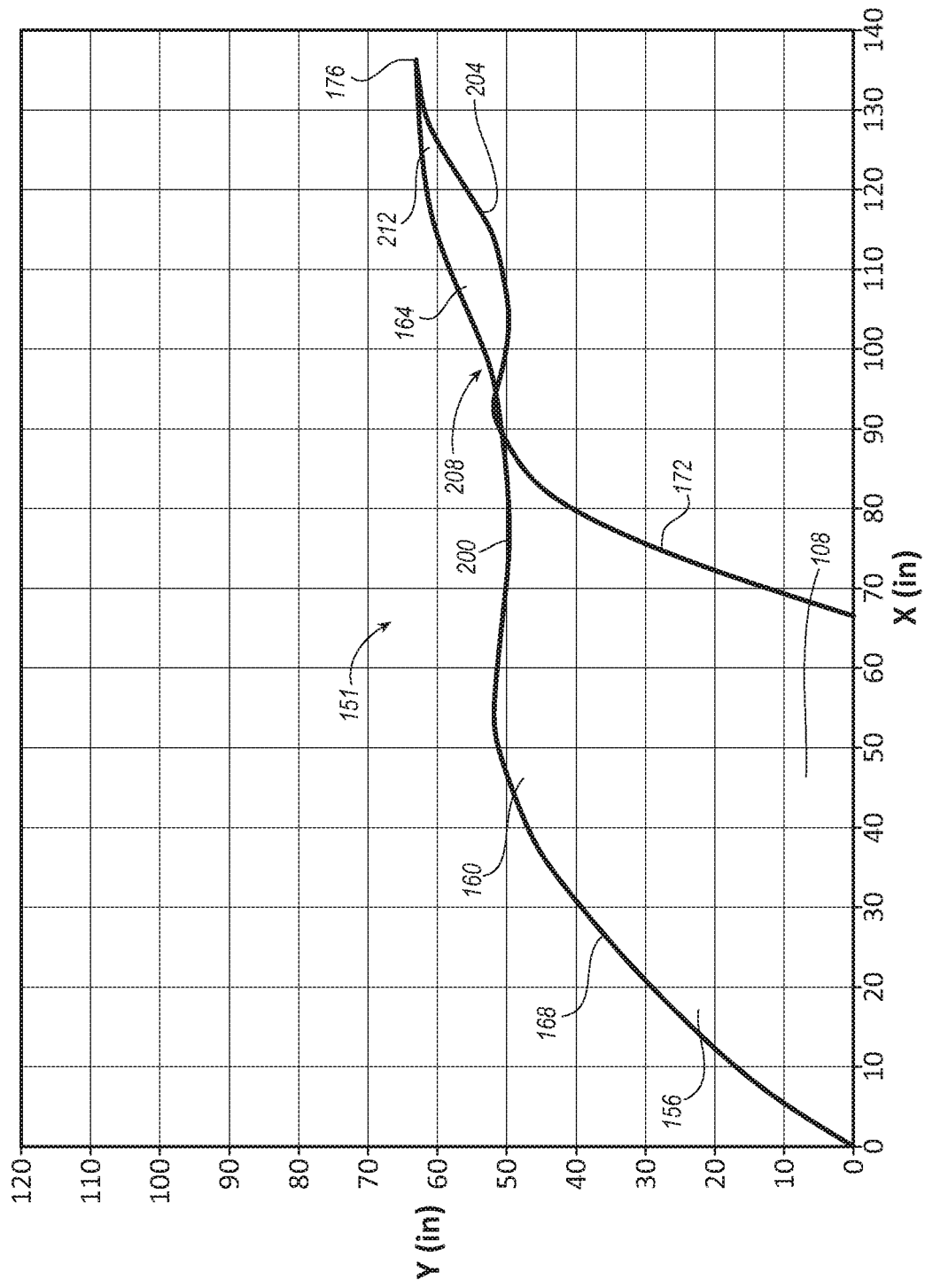
FIG. 3B illustrates a top view of the leading and trailing edges of the blended winglet coupled with an airplane wing in accordance with some embodiments.

FIG. 3A illustrates a top view of the split blended winglet 150 coupled with a tip of the second wing 108. Likewise, FIG. 3B illustrates a top view of the blended winglet 151 coupled with a tip of the second wing 108. As mentioned hereinabove, the structures and mechanisms disposed at the tip of the second wing 108 are substantially identical to those disposed at the tip of the first wing 104. As shown in FIGS. 3A and 3B, the leading edge 168 includes a compound curve 208 having a sigmoidal shape, the compound curve 208 beginning with the radius section 160 and extending to at least a linear upper blade portion 212 that terminates at the winglet tip 176. Between the radius section 160 and the linear upper blade portion 212, the leading edge 168 comprises a reverse curve portion 200 of the compound curve 208 extending along the blade section 164. Similarly, the trailing edge 172 includes such a compound curve, wherein the trailing edge comprises a reverse curve portion 204 extending along the blade section 164. As such, the blade section 164 projects vertically along the compound reverse curve 208 (see FIG. 4A) before transitioning to the linear upper blade portion 212 that terminates at the winglet tip 176. The compound reverse curve 208 is configured such that an upper surface 216 of the blade section 164 includes a downward-facing portion 220 adjacent to the upper blade portion 212. Experimental observation has demonstrated that the downward-facing portion 220 generally contributes to a reduction in the bending moment exerted on the wing.

Figure 4A:
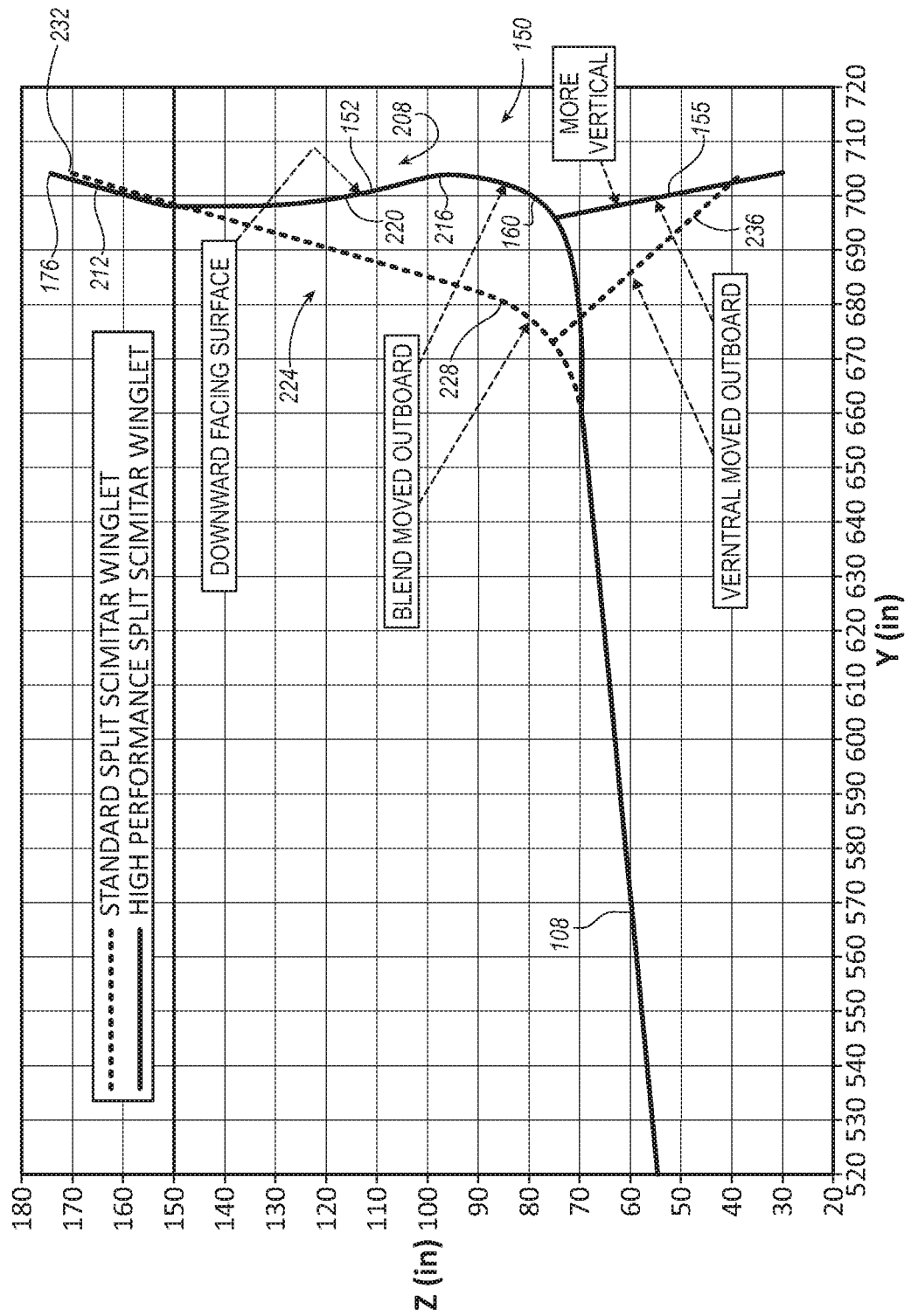
FIG. 4A illustrates a trailing edge shape of an airplane wing and the split blended winglet coupled with the wing overlaid with the trailing edge of a same airplane wing and a standard split blended winglet coupled with the wing in accordance with some embodiments.

FIG. 4A illustrates a trailing edge shape of the wing 108 and the split blended winglet 150 overlaid with the trailing edge of a standard split blended winglet 224 coupled with the wing 108. Observation has demonstrated that the split blended winglet 150 exhibits a reduction in drag ranging between about 1.6% and 2.0% relative to the standard split blended winglet 224 under the same loading. As shown in FIG. 4A, the radius section 160 of the split blended winglet 150 is positioned outboard of a radius section 228 of the standard split blended winglet 224. Further, the compound reverse curve 208 positions the winglet tip 176 in a vertical position nearly the same as the position of a winglet tip 232 of the standard split blended winglet 224. Thus, the split blended winglet 150 provides relatively more effective wingspan than the standard split blended winglet 224 without undesirably positioning the winglet tip 176 farther outboard.

With continuing reference to FIG. 4A, the radius section 160 of the split blended winglet 150 positions the ventral fin 155 farther outboard than a ventral fin 236 of the standard split blended winglet 224. Further, the ventral fin 155 has a relatively greater cant angle than the ventral fin 236, and thus the ventral fin 155 is more vertically oriented than the ventral fin 236. Observations have shown that the greater cant angle of the ventral fin 155, as well as the downward-facing portion 220 of the blade section 164, advantageously reduce the bending load exerted on the wing 108 as compared with the standard split blended winglet 224.

Figure 4B:
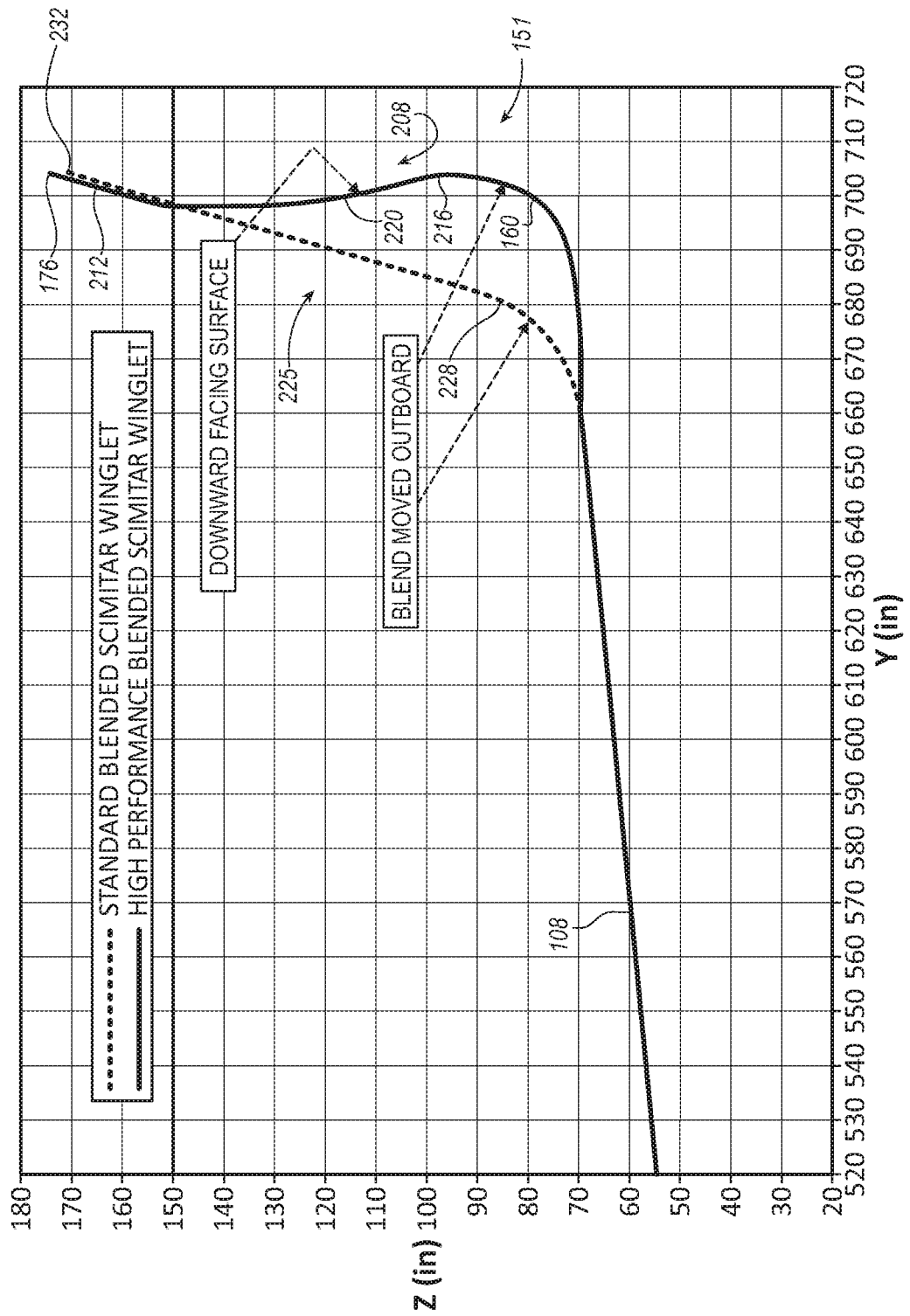
FIG. 4B illustrates a trailing edge shape of an airplane wing and the blended winglet coupled with the wing overlaid with the trailing edge of a same airplane wing and a standard blended winglet coupled with the wing in accordance with some embodiments.

Similar to FIG. 4A, FIG. 4B illustrates a trailing edge shape of the wing 108 and the blended winglet 151 overlaid with the trailing edge of a standard blended winglet 225 coupled with the wing 108. As shown in FIG. 4B, the radius section 160 of the blended winglet 151 is positioned outboard of a radius section 228 of the standard blended winglet 225. Further, the compound reverse curve 208 positions the winglet tip 176 in a vertical position nearly the same as the position of a winglet tip 232 of the standard blended winglet 225. Thus, the blended winglet 151 provides relatively more effective wingspan than the standard blended winglet 225 without undesirably positioning the winglet tip 176 farther outboard.

Figure 5A:
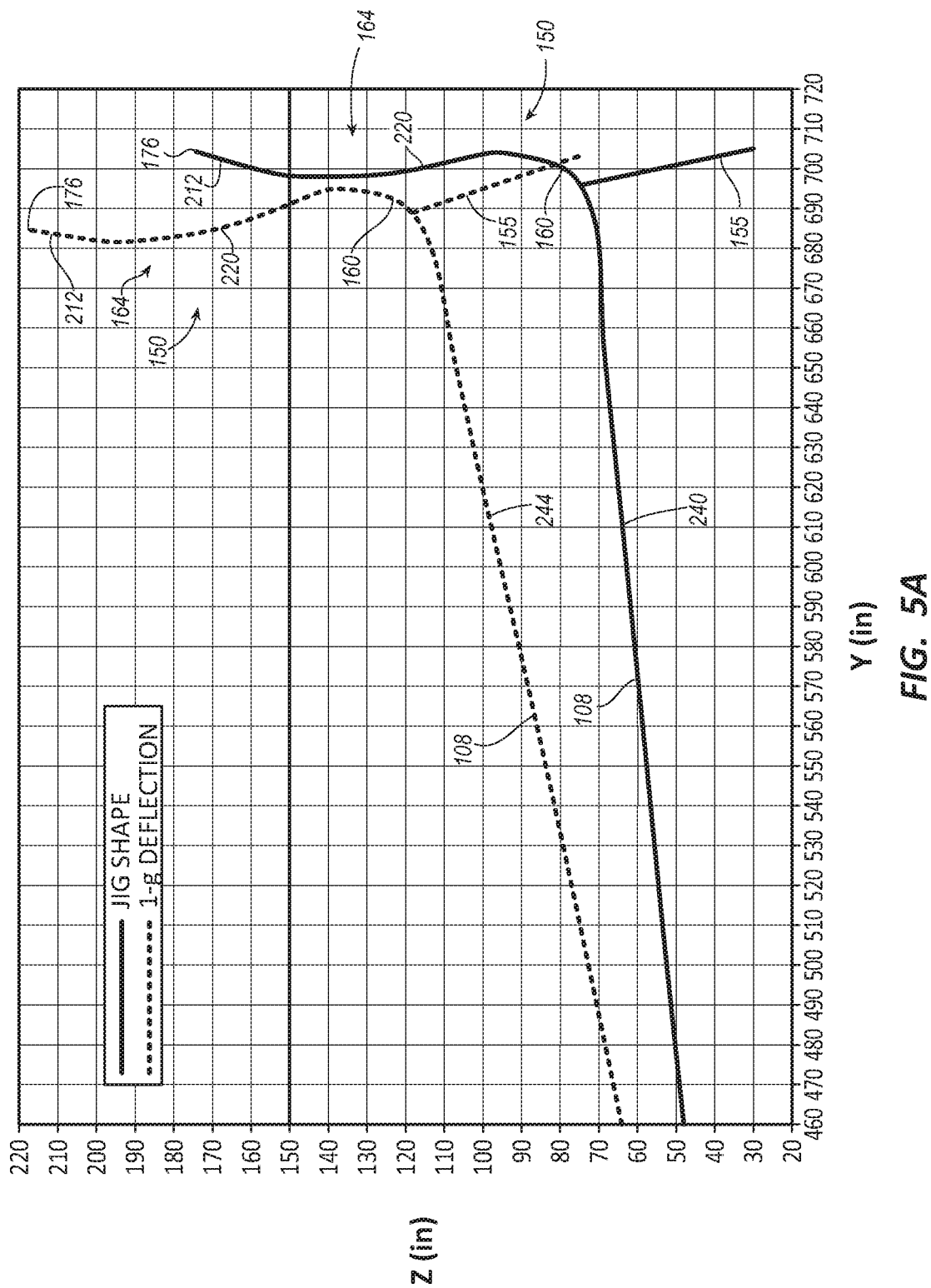
FIG. 5A illustrates a trailing edge shape of an airplane wing and the split blended winglet coupled with the wing while at rest on the ground and during flight at cruising speeds in accordance with some embodiments.

FIG. 5A illustrates a trailing edge shape of the wing 108 and the split blended winglet 150 while at rest on the ground and during flight at cruising speeds. As shown in FIG. 5A, a ground profile 240 represents the trailing edge of the wing 108 and the split blended winglet 150 while at rest on the ground. During flight at cruising speed, however, the ground profile 240 is deflected upwards into a cruising profile 244. As will be appreciated, the vertical orientation of the ventral fin 155 limits the outboard deflection of the ventral fin 155 during flight, thereby limiting the bending load exerted on the wing 108. In addition, during flight, the downward-facing portion 220 of the blade section 164 is angled further downward, thereby advantageously reducing the bending moment exerted on the wing 108. As mentioned herein, the greater cant angle of the ventral fin 155 and the downward-facing portion 220 of the blade section 164 contribute to reducing the bending load exerted on the wing 108 as compared with the standard split blended winglet 224 discussed in connection with FIG. 4A.

Figure 5B:
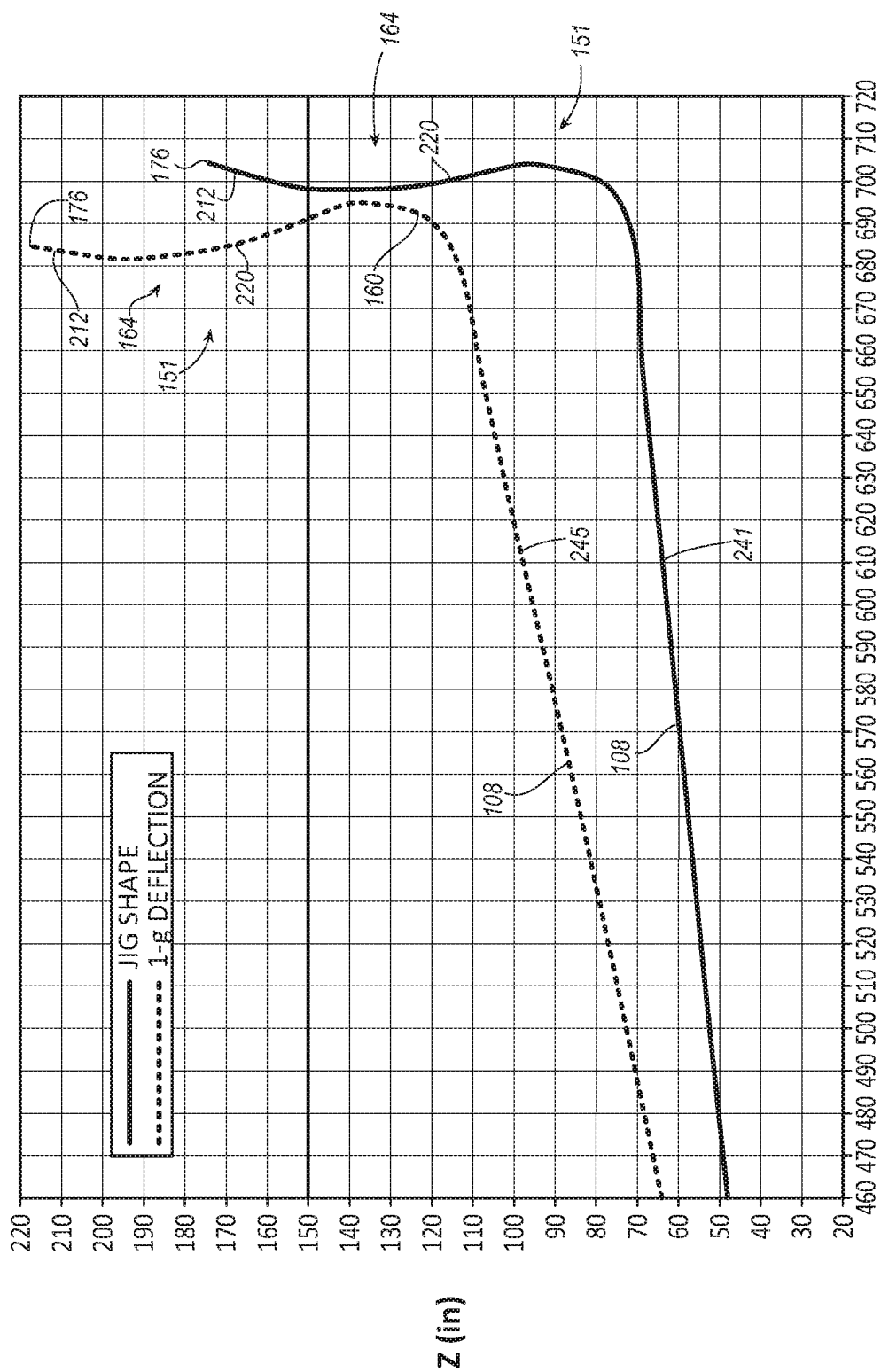
FIG. 5B illustrates a trailing edge shape of an airplane wing and the blended winglet coupled with the wing while at rest on the ground and during flight at cruising speeds in accordance with some embodiments.

Similar to FIG. 5A, FIG. 5B illustrates a trailing edge shape of the wing 108 and the blended winglet 151 while at rest on the ground and during flight at cruising speeds. As shown in FIG. 5B, a ground profile 241 represents the trailing edge of the wing 108 and the blended winglet 151 while at rest on the ground. During flight at cruising speed, however, the ground profile 241 is deflected upwards into a cruising profile 245. As will be appreciated, during flight, the downward-facing portion 220 of the blade section 164 is angled further downward, thereby advantageously reducing the bending moment exerted on the wing 108.

While some particular embodiments have been disclosed herein, and while the particular embodiments have been disclosed in some detail, it is not the intention for the particular embodiments to limit the scope of the concepts provided herein. Additional adaptations or modifications can appear to those of ordinary skill in the art, and, in broader aspects, these adaptations or modifications are encompassed as well. Accordingly, departures may be made from the particular embodiments disclosed herein without departing from the scope of the concepts provided herein.

What is claimed is:

1. A split blended winglet designed for an airplane wing, comprising:

an upper winglet section comprising:
  a base section configured for attachment to a tip of the airplane wing;
  a blade section projecting vertically above the base section along a reverse curve;
  a planar upper blade portion extending from the blade section along a length before terminating at a winglet tip, wherein the planar upper blade portion has a constant angle relative to an axis defined by the airplane wing along the length; and
  a radius section interconnecting the base section and the blade section; and
a lower winglet section including a ventral fin projecting in a vertical direction below the base section.

2. The split blended winglet of claim 1, wherein the upper winglet section includes a leading edge and a trailing edge respectively comprising an extension of a leading edge and a trailing edge of the airplane wing, the leading edge and the trailing edge of the upper winglet section extending along the base section, the radius section, upwards along the blade section, and along the planar upper blade portion.

3. The split blended winglet of claim 2, wherein the leading edge and the trailing edge of the upper winglet section curve toward an airstream direction and terminate at the winglet tip.

4. The split blended winglet of claim 2, wherein the leading edge and the trailing edge of the upper winglet section comprise a compound curve beginning with the radius section, extending along the blade section, extending along the planar upper blade portion, and terminating at the winglet tip.

5. The split blended winglet of claim 1, wherein the reverse curve is configured such that an upper surface of the blade section includes a downward-facing portion adjacent to the planar upper blade portion.

6. The split blended winglet of claim 5, wherein an angle between the axis defined by the airplane wing and an axis defined by the downward-facing portion is greater than 1° and less than 90°.

7. The split blended winglet of claim 5, wherein the downward-facing portion is configured to contribute to a reduction in a bending moment exerted on the airplane wing.

8. The split blended winglet of claim 1, wherein the lower winglet section is joined with the upper winglet section at an attachment location about the radius section.

9. The split blended winglet of claim 1, wherein the lower winglet section includes a chord length that is equal to or less than a chord length of the upper winglet section at an attachment location about the radius section where the lower winglet section is joined with the upper winglet section.

10. The split blended winglet of claim 1, wherein the lower winglet section includes a leading edge comprising a curved portion configured to reduce a discontinuity between the upper winglet section and the lower winglet section.

11. The split blended winglet of claim 10, wherein the curved portion extends from a bottom surface of the radius section.

12. The split blended winglet of claim 11, wherein the leading edge of the lower winglet section is a planar projection extending from the curved portion before transitioning along an airstream-directed continuous curve toward a tip of the ventral fin.

13. The split blended winglet of claim 12, wherein the lower winglet section includes a trailing edge that is a planar projection extending from the radius section before curving towards the tip of the ventral fin.

14. The split blended winglet of claim 1, wherein the radius section is positioned outboard of an axis extending between the tip of the airplane wing and the winglet tip.

15. The split blended winglet of claim 1, wherein the ventral fin of the split blended winglet extends at an angle of between 80° and 100° relative to the axis of the airplane wing.

16. The split blended winglet of claim 15, wherein the angle of the ventral fin reduces a bending load exerted on the airplane wing.

17. A blended winglet designed for an airplane wing, comprising:
  a base section configured for attachment to a tip of the airplane wing;
  a blade section projecting vertically above the base section along a reverse curve;
  a planar upper blade portion extending from the blade section along a length before terminating at a winglet tip, wherein the planar upper blade portion has a constant angle relative to an axis defined by the airplane wing along the length; and
  a radius section interconnecting the base section and the blade section.

18. The blended winglet of claim 17, wherein the blended winglet includes a leading edge and a trailing edge respectively comprising an extension of a leading edge and a trailing edge of the airplane wing, the leading edge and the trailing edge of the blended winglet extending along the base section, the radius section, and upwards along the blade section.

19. The blended winglet of claim 18, wherein the leading edge and the trailing edge of the blended winglet curve toward an airstream direction and terminate at the winglet tip atop the blade section.

20. The blended winglet of claim 17, wherein the reverse curve is configured such that an upper surface of the blade section includes a downward-facing portion adjacent to the planar upper blade portion.

21. The blended winglet of claim 20, wherein the downward-facing portion is configured to contribute to a reduction in a bending moment exerted on the airplane wing.

22. The blended winglet of claim 20, wherein an angle between the axis defined by the airplane wing and an axis defined by the downward-facing portion is greater than 1° and less than 90°.

23. The blended winglet of claim 18, wherein the leading edge and the trailing edge of the blended winglet comprise a compound curve beginning with the radius section and extending along the blade section including the reverse curve.

* * * * *